J. F. WEBB, Sr.
AUXILIARY POWER ATTACHMENT FOR AERIAL NAVIGATING MACHINES.
APPLICATION FILED JULY 8, 1916.

1,295,648.

Patented Feb. 25, 1919.
7 SHEETS—SHEET 2.

INVENTOR
Jean F. Webb, Sr.
BY
Fred G. Dieterich & Co
ATTORNEYS

UNITED STATES PATENT OFFICE.

JEAN F. WEBB, SR., OF NEW YORK, N. Y.

AUXILIARY POWER ATTACHMENT FOR AERIAL NAVIGATING-MACHINES.

1,295,648.	Specification of Letters Patent.	Patented Feb. 25, 1919.

Application filed July 3, 1916. Serial No. 108,115.

*To all whom it may concern:*

Be it known that I, JEAN F. WEBB, Sr., residing at New York, in the county of New York and State of New York, have invented certain new and useful Improvements in Auxiliary Power Attachments for Aerial Navigating-Machines, of which the following is a specification.

My invention has for its object to provide for air craft of any form or make, an auxiliary mechanism that can be used for either lifting, sustaining or propelling the dead weight of said air craft independently of the main propellers and to utilize the full power of the engine or engines by distributing it between a plurality of propellers, some of which may lift the weight, while others are propelling the craft in a forward direction.

Another object of the invention is to enable air craft to rise quickly into the air in starting, without the necessity of a long run on the ground to gain momentum sufficient to force the air against the planes with power enough to lift the craft. Again, it is an object of my invention to prevent accidents in landing after a flight, as the angle of the auxiliary propellers can be reversed in such a manner that the speed can be graduated to a slow and safe landing without a jar or shock.

My invention also has for its object to increase the lifting and carrying power of air craft for either freight or passengers by the provision of auxiliary propellers which can be kept at any desired angle to equalize and sustain loads of varying proportions and yet, at the same time, assist the main propellers in driving forward.

My invention has for a still further object the provision of additional force through the medium of auxiliary propellers whereby the speed of the craft may be greatly increased and its stability more readily controlled so as to keep the craft on an even keel or line of flight and thus decrease the liability of accidents from sudden gusts or changes of the wind or air pockets.

In its generic nature, the invention comprises a set of auxiliary propellers with driving connections between the air craft engine or engines and the propellers, and mechanism for so mounting the propellers with relation to the machine that the propeller devices can be turned through a complete circle to direct their force of action either vertically upward or downward, horizontally forward or backward, or at any intermediate position, the arrangement of parts being such that all of the propelling mechanisms, or selected groups of the same, may be controlled as to their position by a single device under the control of the operator. The invention also has provision for incasing or inclosing the drive shaft and transmission gearing through which the engine power is delivered to the auxiliary propeller shafts in such manner that a uniform distribution of lubricant may be had to keep the parts well lubricated and inclose the same from the elements and at the same time provide as little wind resistance in the line of flight as possible.

More specifically the invention resides in providing a transverse driving shaft and a shaft housing for the same in which the driving shaft has bearings, and means for sustaining the shaft housing relatively immovable in position with relation to the air craft, the housing also having bearing supports for a control shaft which is designed to be gear-connected with the rotatable bearing casing on which the propeller sustaining "spectacle" frame section is carried, such bearing casing being rotatably journaled on the shaft housing and serving as an inclosure for the connecting gearing between the propeller shaft and the transverse shaft, there being also a shaft drive and gear connection between the transverse shaft and the air craft engine unit or units.

In its practical application to machines of the aeroplane type, I prefer to locate one propeller of a set near each lateral extremity of the machine and where deep planes are used other sets of auxiliary propelling devices may be employed, the propeller shaft frame bearings at the respective sides being then connected by a suitable connection whereby the operation of turning one of the sets of propellers will be transmitted simultaneously to the other set for uniformity of action; but when the invention is employed in connection with air craft of the dirigible type the auxiliary propellers are located on the sides of the boat.

In its more subordinate nature, the invention includes those novel details of construction, combination and arrangement of parts, all of which will be first fully described, then specifically pointed out in the appended claims, and illustrated in the accompanying drawings, in which:—

Fig. 3 is a detail cross section on substantially the line 3—3 of Fig. 2 looking forward.

Referring now to the accompanying drawings, in which like numerals of reference indicate like parts in all of the figures, 1 designates the fuselage of the air craft, 2 the planes, 3 the elevation rudder, 4 the direction rudder, 5 the engine or engines which drive the main propellers 6, and 7 designates the front landing truck, while 8 indicates the rear skid, and 9 designates the side skids at the extremities of the lower plane, all of the aforesaid parts being of the usual construction and, *per se*, constituting no part of my present invention.

In the application of my invention to air craft of the heavier than air type such as the one shown in the drawings, I provide a shaft casing 10 which preferably extends transversely beneath the lower plane and is sustained by a system of braces or stays 11—12, which braces or stays serve to hold the housing 10 in a substantially rigid position with relation to the plane from which it is supported. The housing at a suitable place is provided with a gear housing section 13, this housing being located preferably in the mid-plane of the machine.

Within the housing 10 is a driven shaft 14 which is journaled in suitable anti-friction bearings 15 located at intervals within the housing 10 and, while I have not illustrated it, the shaft 14 may be, if found desirable, made in sections and provided with universal joints to allow for bending or flexing.

The shaft housing 10 is made in sections, the outer sections 16 (see Fig. 7) being spaced from the intermediate sections to provide for the location of a transmission gear 17 on the shaft 14 for the purpose of driving the auxiliary propellers hereinafter again referred to.

Figures 5, 6:
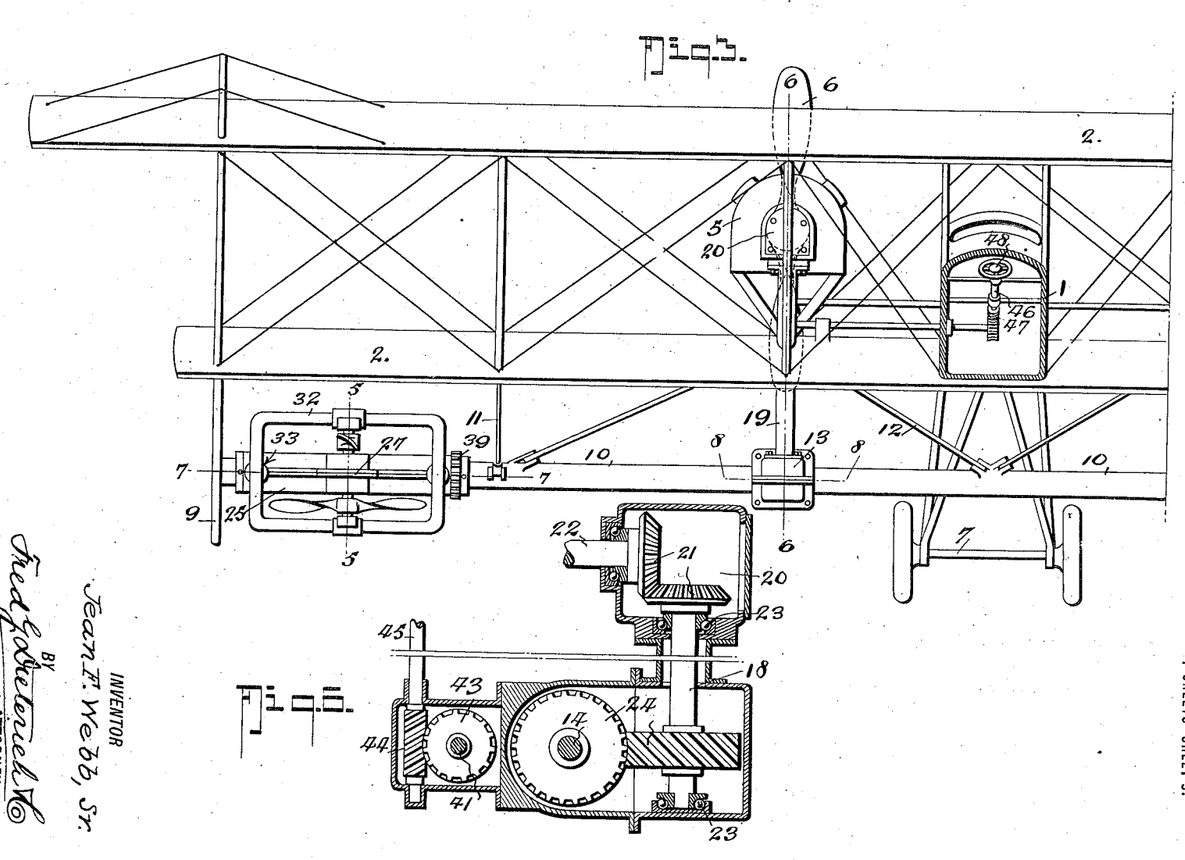
Fig. 5 is an enlarged vertical section on the line 5—5 of Fig. 3.
Fig. 6 is an enlarged vertical section of the invention on the line 6—6 of Fig. 3.
Figure 5:
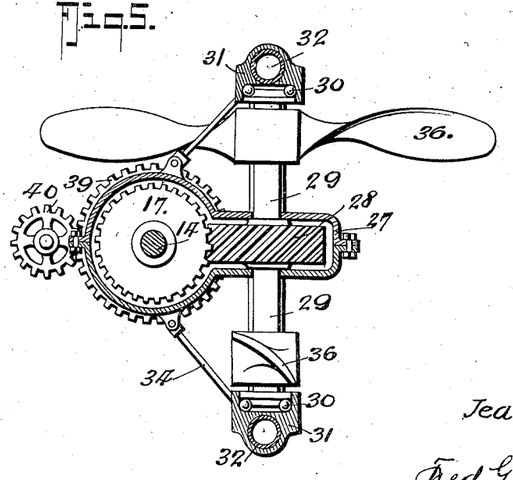

The shaft 14 is driven from the engine shaft through the medium of a driving shaft 18 which extends upwardly through a shaft housing 19 that is coupled to the gear housing 13 and to a second gear housing 20 in which the beveled gears 21 (see Fig. 6) that connect the engine shaft 22 with the driving shaft 18 are located, it being understood that suitable anti-friction bearings 23 are provided for the shaft 18 where necessary.

The drive shaft 18 is operatively connected with the driven shaft 14 by gears 24—24, these gears being preferably spiral gears of a 45° pitch.

25 designates a housing-bearing which is rotatably mounted on anti-friction bearings 26 on the adjacent ends of the driven shaft housing sections 10 and 16 and it includes a gear housing portion 27 so that the bearing 25 forms an inclosure for the separated ends of the housing sections 10 and 16 and the gear housing portion 27 forms an inclosure for the connecting gears 17 and 28 by which the propeller shaft 29 is driven. The propeller shaft 29 is journaled in anti-friction bearings 30 in bearing members 31 which are carried on a rectangular tubular frame 32 which is supported at 33 from the housing-bearing 25 to which it is also preferably braced as at 34 (see Fig. 5). The housing-bearing 25 and the gear housing portion 27 are preferably made in halves (see Figs. 5 and 7) for convenience in assembling.

Figure 1:
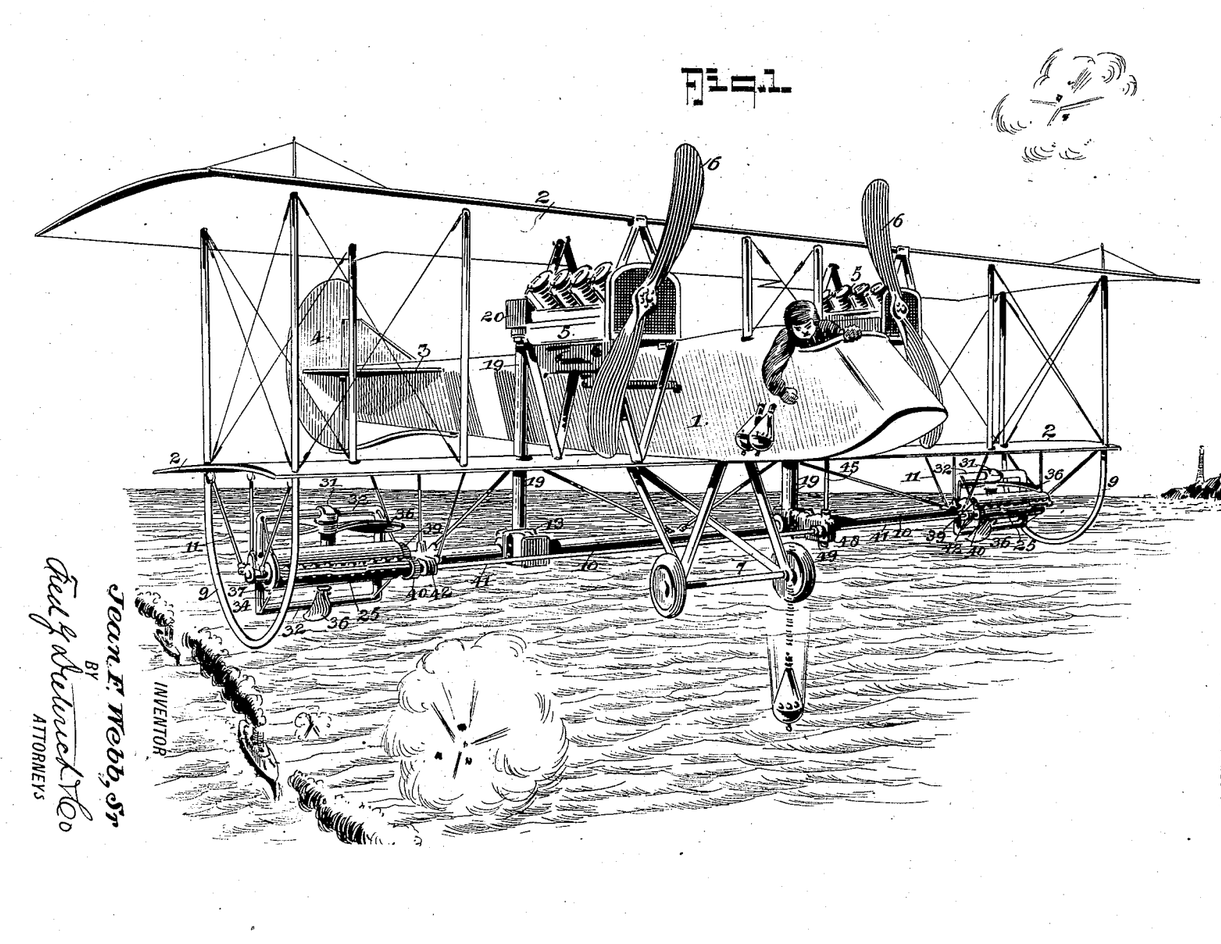
Figure 1 is a perspective view of an aeroplane of the Curtiss type with the invention applied.
Figures 2, 9:
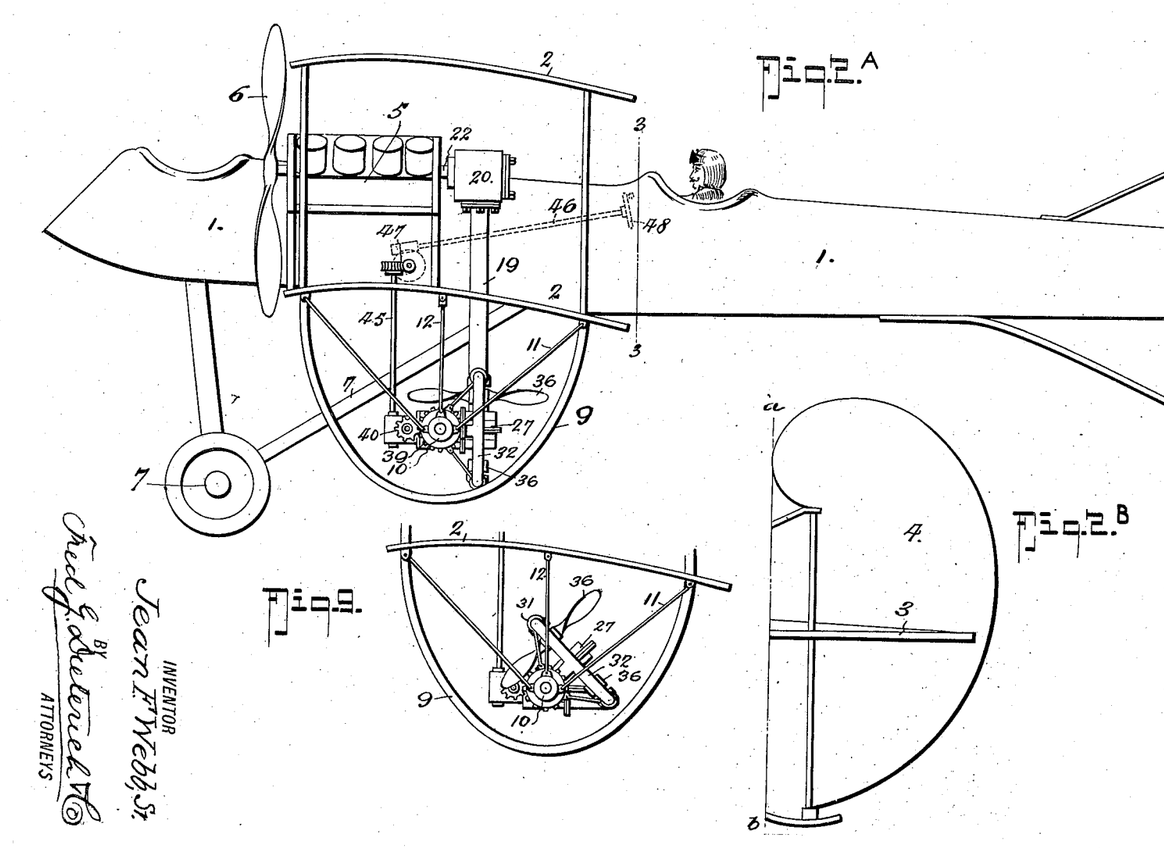
Fig. 2 (which consists of Figs. 2A and 2B joined on the line a—b) is a side elevation of the machine with my invention in use.
Fig. 9 is a detail elevation showing the auxiliary propellers tilted to a 45° angle for forward and upward propulsion effect.
Figure 4:
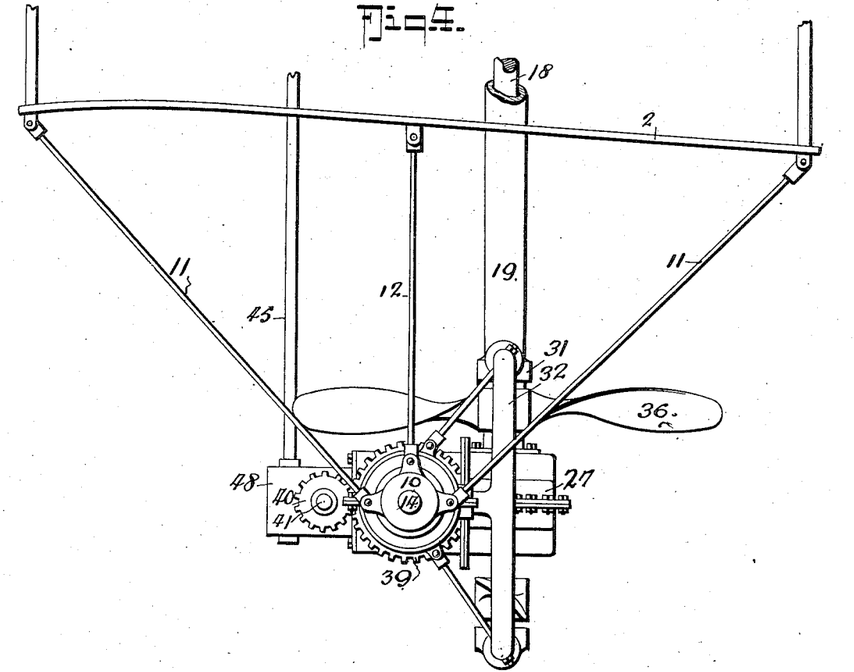
Fig. 4 is an enlarged side elevation of the invention showing the manner of suspending the same below the lower plane.

36 designates the propellers of which two are preferably employed on each shaft 29 and I prefer to locate these propellers at right angles to one another to more readily balance the construction. The housing-bearing 25 is held from lateral movement by collars 37 on the driven shaft housing sections 10 and 16 and it is adapted to be rotated around the axis of the shaft 14 by a mechanism best shown in Figs. 2a, 7 and 8 of the drawings, by reference to which it will be seen that I provide the housing-bearing 25 with a gear 39 which meshes with a pinion 40 on a countershaft 41 which is journaled in suitable bearing brackets 42 extending from the housing 10 and carries a worm gear 43 that meshes with a worm 44 on a shaft 45 that extends upwardly above the plane 2 (preferably into the fuselage 1) and is adapted to be operated by the machine operator, a suitable shaft 46 and suitable gear connection 47 between the shafts 46 and 45 being provided to bring the control wheel 48 within easy reach of the operator (see Fig. 2^A). The worms 43—44 are inclosed in a housing 48 which is mounted on the housing 13, as shown in Fig. 8 of the drawings and which is also provided with suitable bearings 49 for the countershaft 41.

The provision of the worm gear connections 43—44 between the shafts 45 and 41 is of the irreversible type whereby any tendency to turn the shaft 41 will not turn the shaft 45 and thus the shaft 41 is locked from movement except under the influence of the operator and consequently the gear connections 39—40 serve to retain the housing-bearing 25 in any position to which it may be set by the operator.

Figures 7, 8:
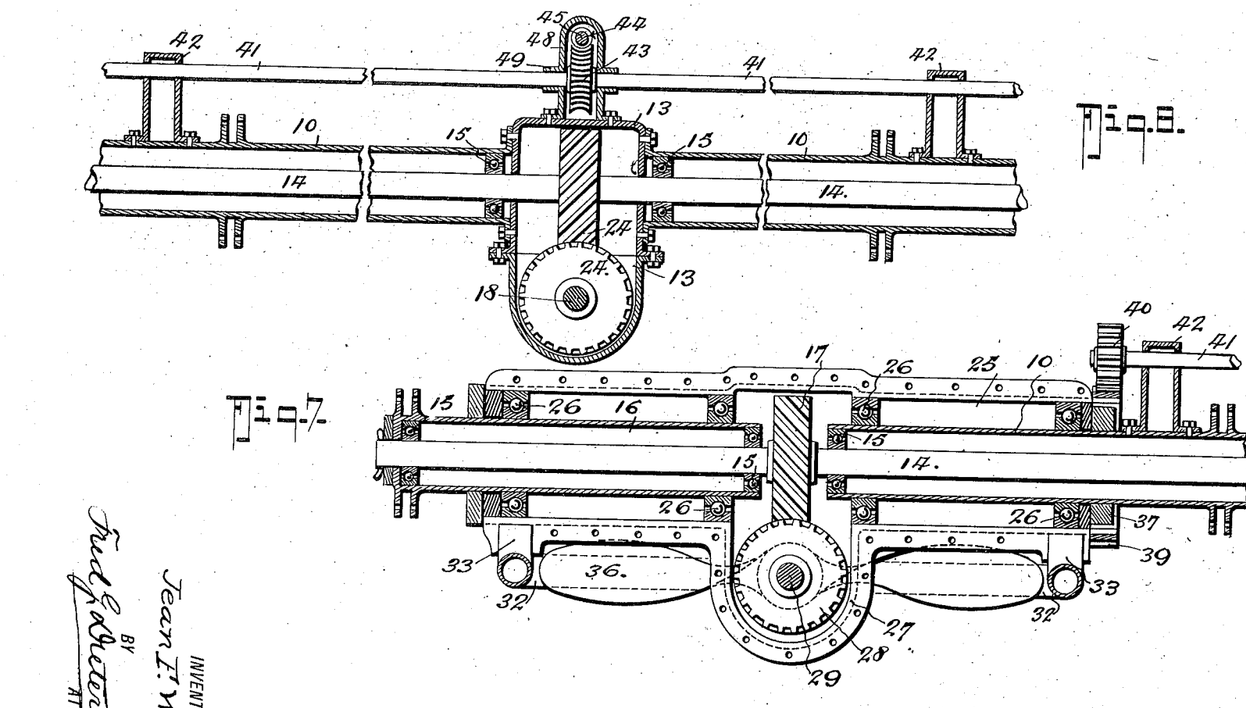
Fig. 7 is an enlarged horizontal section on the line 7—7 of Fig. 3.
Fig. 8 is an enlarged horizontal section on the line 8—8 of Fig. 3.

It should be understood that the mechanism shown in Fig. 7 is duplicated at the other end of the driven shaft, the two propellers, one on the right hand and one on the left hand side constituting a set.

Figure 10:
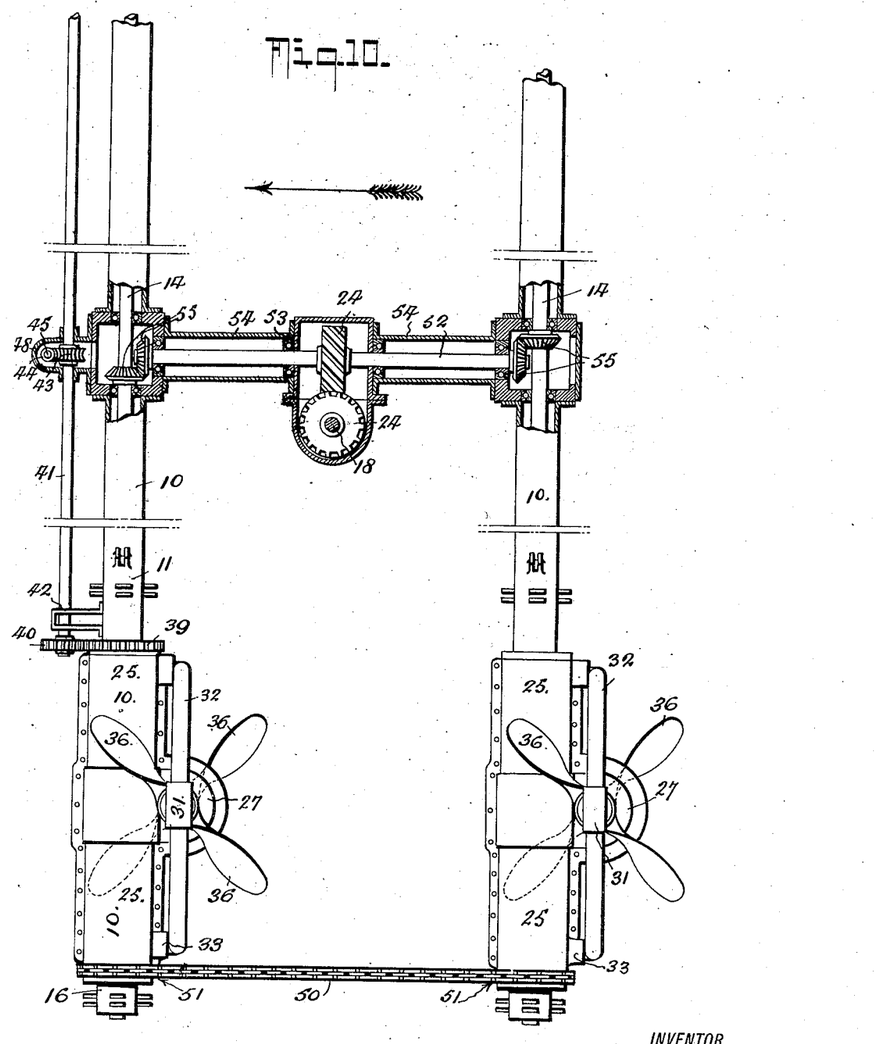
Fig. 10 is a plan view showing how two sets of auxiliary propellers may be employed on deep planed machines.

When two or more sets of propelling mechanisms are employed the arrangement may be such as shown in Fig. 10 of the drawings, by reference to which it will be seen that the housing-bearings 25 of the respective sets are operatively connected together preferably, by a silent chain 50 passing over gears 51 on the bearings 25, so that these bearings 25 may move in unison when the shaft 14 is turned.

The respective shafts 14 of the sets of mechanisms may be driven from the drive shaft 18 that is geared with the engine shaft, by a countershaft 52 journaled in suitable bearings 53 in a shaft housing 54 that connects the housings 10 and the shaft 52 is then provided with the connecting and driving gears 24—24, as before described. The countershaft may then have a beveled gear connection 55 with the respective shafts 14.

Figure 11:
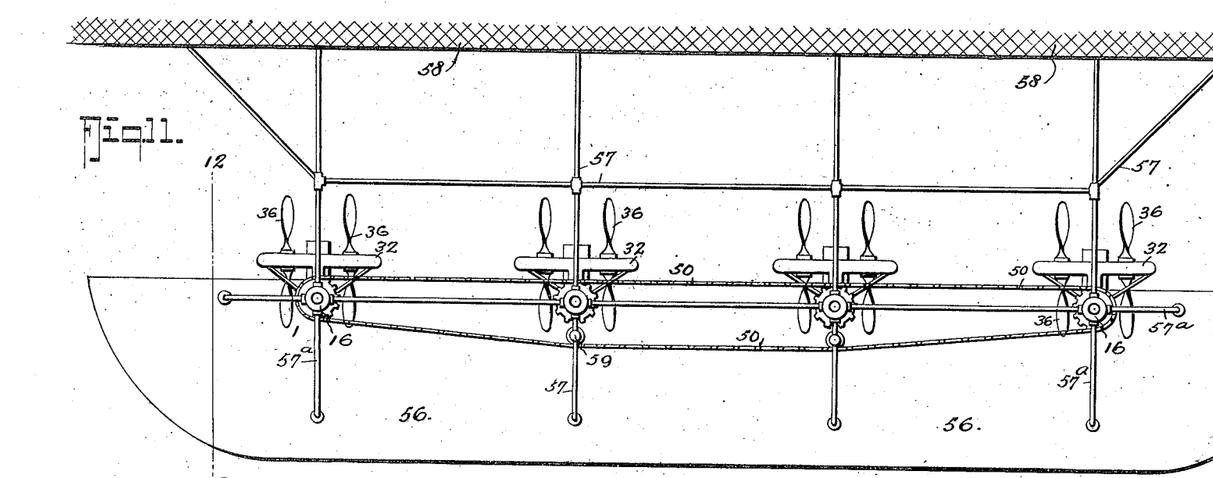
Fig. 11 is a detail side elevation illustrating the application of the invention to air ships of the dirigible balloon type.
Figure 12:
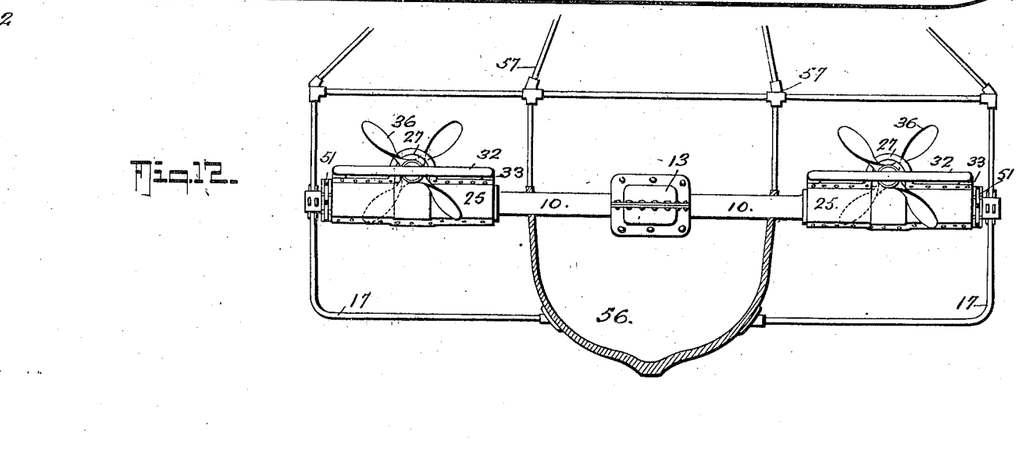
Fig. 12 is a cross section on the line 12—12 of Fig. 11.

In adapting the invention to air craft of the dirigible type the units are mounted on the body 56 which is sustained by a suitable framework 57 from the gas bag or cylinder 58. The various housings 10 are sustained at their middle parts by the body 56 and the outer sections 16 are sustained by an auxiliary frame 57^a which projects from the body. The various housing-bearings 25, at one side of the body, are connected together to operate in one or predetermined sets and the connection may be made, preferably, by a silent chain 50 which takes over the gears 51 and over idler gears 59 at suitable intervals so that a movement of the chain 50, in either direction, will effect a corresponding turning of the propeller frames to direct the propelling function of the auxiliary propellers forward, backward, upward or downward or at an inclination, as may be found desirable, it being understood that the various shafts 14 of the propelling units are gear-connected to a countershaft located within the boat, if desired and geared up with the engine substantially as shown in Fig. 10 of the drawings and further illustration of this is thought to be unnecessary. It should also be understood that the usual engines and main propellers are employed in connection with my invention which are of the usual construction and form, *per se*, no part of the present invention and a detailed illustration and further description of the same is thought to be unnecessary.

It will be seen that by my arrangement of parts the operator is enabled to incline the auxiliary propeller shafts to any desired angle in a rotating plane about the driven shafts as axes or centers and thus a complete control is afforded.

I am aware that heretofore attempts have been made to provide auxiliary propelling and stabilizing mechanism operating on a somewhat similar principle to that of my invention, but in all cases with which I am familiar the mechanisms and constructions suggested are impractical for the purpose, owing to defective design and arrangement of parts which cause interference with the proper operation of the air craft under the influence of its usual and general parts, but it will be noticed with my construction all of the driving parts and gears are located in housings which are preferably shaped in such manner as to afford little wind resistance and at the same time be light and strong in construction and well braced with relation to the machine on which the parts are placed.

When the invention is used in multiple on dirigibles it will enable the engineer or pilot to move all of the side propellers synchronously at any angle desired and in this way direct the course either upwardly or downwardly, irrespective of ballast or of the varying sustaining capacity of the gas container due to cold or heat conditions of the weather. It will also increase the driving or propelling power of dirigibles as the effective action of the side or auxiliary propellers increases the power of the air craft to overcome adverse winds and adds to the velocity of the flight of the craft; it also enables the craft to land more safely and under better control than is possible with the constructions now in common use.

Furthermore by the employment of my invention the practical value of air craft for military use is increased first, by the availability of the auxiliary propellers for forward propulsion to increase the speed of flight; second,—by virtue of the utility of the auxiliary propellers for stabilizing functions; third,—by virtue of the use of the auxiliary propellers for elevating functions and for poising the machine in the air while bombs may be accurately dropped on the ship, fort or other object to be destroyed, the auxiliary propellers being then brought into quick operation for assisting in driving the machine forward to make a "quick get away" after the bomb or bombs have been dropped.

It should be understood that suitable clutch mechanisms of the usual types may be employed for operatively disconnecting the main driving propeller from the engine and connecting and disconnecting the main operative propeller from the engine or for rendering other driven parts operative or inoperative, as may be found desirable, in practice.

Other advantages and uses of my invention will appear to those skilled in the art and a further enumeration of the same is thought to be unnecessary as from the foregoing description taken in connection with the accompanying drawings, it is thought the complete construction, operation and advantages of my invention will be readily understood by those skilled in the art.

What I claim is:

1. An attachment of the character stated comprising a driven shaft, a shaft housing inclosing said shaft, frames, bearings for said frames journaled on said shaft housing, propeller shafts journaled in said frames, gear connections between said propeller shafts and said driving shaft, means for supporting said shaft housing on the air craft, means for turning said frame bearings to change the angle of said propeller shafts and a power transmitting driving shaft adapted to be driven by the propelling engine of the air craft and geared to said driven shaft.

2. In combination with the air craft which includes a propelling engine; a driving shaft connected with the engine, a driven shaft, a gear connection between said shafts, a driving shaft housing and a driven shaft housing, a gear housing coupling said shaft housings together and inclosing said gear connection, means for relatively immovably sustaining said housings in place on the air craft, shaft bearings in the housings for the respective shafts, propeller shafts, supporting frames for said propeller shafts, gear connections between said propeller shafts and said driven shaft, means for rotatably journaling said propeller shaft frames on said driven shaft housing and means for rotating said propeller frames around said driving shaft housing as an axis.

3. In combination with an air craft which includes a propelling engine; a driving shaft connected with the engine, a driven shaft, a gear connection between said shafts, a driving shaft housing and a driven shaft housing, a gear housing coupling said shaft housings together and inclosing said gear connection, means for relatively immovably sustaining said housings in place on the air craft, shaft bearings in the housings for the respective shafts, propeller shafts, supporting frames for said propeller shafts, gear connections between said propeller shafts and said driven shaft, said driven shaft housing being made in sections spaced apart, said last named gear connections including gears on the driven shaft between the respective sections, bearings for carrying said propeller shaft frames, each of said bearings comprising a housing rotatably journaled on the adjacent ends of the driven shaft housing sections and including a gear housing for said gear connections between the driven and propeller shafts, and means for adjustably holding said propeller frames in their respective positions.

4. In combination with an air craft which includes a propelling engine; a driving shaft connected with the engine, a driven shaft, a gear connection between said shafts, a driving shaft housing and a driven shaft housing, a gear housing coupling said shaft housings together and inclosing said gear connection, means for relatively immovably sustaining said housings in place on the air craft, shaft bearings in the housing for the respective shafts, propeller shafts, supporting frames for said propeller shafts, gear connections between said propeller shafts and said driven shaft, said driven shaft housing being made in sections spaced apart, said last named gear connections including gears on the driven shaft between the respective sections, bearings for carrying said propeller shaft frames, each of said bearings comprising a housing rotatably journaled on the adjacent ends of the driven shaft housing sections and including a gear housing for said gear connections between the driven and propeller shafts and means for turning said frames about the driven shaft as an axis.

5. In combination with an air craft which includes a propelling engine; a driving shaft connected with the engine, a driven shaft, a gear connection between said shafts, a driving shaft housing and a driven shaft housing, a gear housing coupling said shaft housings together and inclosing said gear connection, means for relatively immovably sustaining said housings in place on the air craft, shaft bearings in the housings for the respective shafts, propeller shafts, supporting frames for said propeller shafts, gear connections between said propeller shafts and said driven shaft, said driven shaft housing being made in ctions spaced apart, said last named gear connections including gears on the driven shaft between the respective sections, bearings for carrying said propeller shaft frames, each of said bearings comprising a housing rotatably journaled on the adjacent ends of the driven shaft housing sections and including a gear housing for said gear connections between the driven and propeller shafts, means for turning said frames about the driven shaft as and axis, said last named means comprising a controlling shaft, gear connections between said controlling shaft and said controller-shaft-frame-carrying bearings, and means for operating said propeller shaft.

6. In combination with an air craft which includes a propelling engine; a driving shaft connected with the engine, a driven shaft, a gear connection between said shafts, a driving shaft housing and a driven shaft housing, a gear housing coupling said shaft housings together and inclosing said gear connection, means for relatively immovably sustaining said housings in place on the air craft, shaft bearings in the housings for the respective shafts, propeller shafts, supporting frames for said propeller shafts, gear connections between said propeller shafts and said driven shaft, said driven shaft housing being made in sections spaced apart, said last named gear connections including gears on the driven shaft between the respective sections, bearings for carrying said propeller shaft frames, each of said bearings comprising a housing rotatably journaled on the adjacent ends of the driven shaft housing sections and including a gear housing for said gear connections between the driven and propeller shafts, means for turning said frames about the driven shaft as an axis, said last named means comprising a controlling shaft, gear connections between said controlling shaft and said propeller shaft-frame-carrying bearings, means for operating said propeller shaft having provisions for sustaining said operating shaft and said frames in their positions of adjustment.

7. In combination with an air craft having the usual sustaining and propelling mechanism, said propelling mechanism including a drive motor, of an auxiliary propelling device, means for sustaining said device in position on the air craft, said auxiliary propelling device comprising a driven shaft, a driving shaft connecting the air craft motor with said driven shaft, a pair of propeller carrying frames, bearings on which said frames are sustained, means for supporting said bearings around said driven shaft as an axis, means for turning said frames bodily around said driven shaft as an axis including provisions for sustaining said frames in their various positions, propeller shafts journaled in said frames, power transmitting connections between said propeller shafts and said driven shaft, and shaft and gear housings for the driving and driven shafts and the gear connections between the same.

8. In an auxiliary power device for air craft, the combination with the main power producing engine of the craft; auxiliary propellers, shafts on which said propellers are carried, propeller shaft carrying frames having bearings for said shafts, a supporting housing, bearings on which said frames are carried, said bearings being journaled on said supporting housing for rotation around the same, a driving shaft connected with the air craft engine, a driven shaft connected with said driving shaft and journaled in said supporting housing, power transmitting connections between said driven shaft and the respective propeller shafts, an adjusting shaft, bearings for said adjusting shaft, gear connections between said adjusting shaft and said propeller frame bearings shaft whereby when said adjusting shaft is turned said bearings will be rotated around said housing as an axis, and a power transmitting device under control of the operator for turning the said adjusting shaft.

JEAN F. WEBB, Sr.